United States Patent
Sheng et al.

(10) Patent No.: US 12,455,873 B1
(45) Date of Patent: Oct. 28, 2025

(54) DATA ANOMALY DETECTION SYSTEM

(71) Applicant: eBay Inc., San Jose, CA (US)

(72) Inventors: Shaodong Sheng, Shanghai (CN); Yi Wang, Shanghai (CN); Geng Zhu, Shanghai (CN)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 18/646,101

(22) Filed: Apr. 25, 2024

(51) Int. Cl.
*G06F 16/00* (2019.01)
*G06F 16/23* (2019.01)
*G06F 16/25* (2019.01)

(52) U.S. Cl.
CPC ........ *G06F 16/2365* (2019.01); *G06F 16/258* (2019.01)

(58) Field of Classification Search
CPC .......................... G06F 16/2365; G06F 16/258
USPC ........................................................ 707/690
See application file for complete search history.

(56) References Cited

U.S. PATENT DOCUMENTS

| | | | |
|---|---|---|---|
| 10,474,932 B2 | 11/2019 | Fineis et al. | |
| 2011/0021451 A1* | 1/2011 | Wenk | A61P 35/00 706/20 |
| 2021/0216883 A1* | 7/2021 | Srinivasan | G06N 20/00 |
| 2021/0273955 A1 | 9/2021 | Villella et al. | |

FOREIGN PATENT DOCUMENTS

CN 112241145 1/2021

OTHER PUBLICATIONS

"New Approaches for Outlier Detection"; By: Christopher Zwilling, Published 2017 (Year: 2017) file:///C:/Users/cdaye1/Downloads/ZWILLING-DISSERTATION-2017.pdf.*
"New Approaches for Outlier Detection"; By: Christopher Zwilling, Published 2016 (Year: 2016) file:///C:/Users/cdaye1/Downloads/ZWILLING-DISSERTATION-2017%20(1).pdf.*
"European Application Serial No. 251720744, Extended European Search Report mailed Aug. 12, 2025", 9 pgs.
Afzal, Saima, "A Novel Approach for Outlier Detection in Multivariate Data", Mathematical Problems In Engineering, (Oct. 2021), 12 pgs.

(Continued)

*Primary Examiner* — Chelcie L Daye
(74) *Attorney, Agent, or Firm* — SCHWEGMAN LUNDBERG & WOESSNER, P.A.

(57) ABSTRACT

Systems and methods are directed to detecting data anomalies. A data analysis system accesses data generated on a data platform. The data analysis system then analyzes the data to detect one or more data anomalies. The analyzing includes generating an optimal coordinate system without reducing a number of dimensions using principal component analysis (PCA), transforming the data into the optimal coordinate system without reducing the number of dimensions, and applying a sigma rule to the transformed data on the optimal coordinate system. The sigma rule can be the 3-sigma rule. In some cases, the data analysis system generates and transmits a notification or alert to a user or downstream component regarding the one or more data anomalies. In some cases, the data analysis system removes the one or more data anomalies to derive updated data and can provide the updated data to downstream systems for use.

20 Claims, 7 Drawing Sheets

(56) References Cited

OTHER PUBLICATIONS

Hubert, Mia, "Robust PCA for skewed data and its outlier map", Computational Statistics and Data Analysis, NrthHolland,Amsterdam, NL, vol. 53, No. 6, (Apr. 15, 2009), 13 pgs.

Miao, Yuantian, "Comprehensive Analysis of Network Traffic Data", 2016 IEEE International Conference on Computer and Information Technology, (Dec. 8, 2016), 8 pgs.

Taskesen, Erdogan, "Outlier Detection Using Principal Component Analysis and Hotellings T2 and SPE DmodX Methods", Towards Data Science, (Mar. 11, 2023), 8 pgs.

Zhang, Shaoxing, "Analysis of Outlier Detection Rules Based on the ASHRAE Global Thermal Comfort Database", Science Direct, Building and Environment vol. 234, (Apr. 15, 2023), 5 pgs.

Zou, Hui, "Sparse Principal Component Analysis", Journal of Computational and Graphical Statistics,, vol. 15, No. 2,, (Apr. 26, 2004), 30 pgs.

\* cited by examiner

DATA ANOMALY DETECTION SYSTEM

TECHNICAL FIELD

The subject matter disclosed herein generally relates to data anomaly detection. Specifically, the present disclosure addresses systems and methods that detect data anomalies by generating a new coordinate system, transforming data into the new coordinate system, and applying a sigma statistics rule.

BACKGROUND

A data platform may have tens of thousands of pipeline jobs running on a daily basis. These jobs produce a large amount of data. This leads to the problem of how to efficiently monitor the data and accurately detect abnormal data or data anomalies. If data anomalies are not detected and fixed, the data anomalies can cause incorrect results in downstream processes or systems.

DETAILED DESCRIPTION

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

Figure 1A:
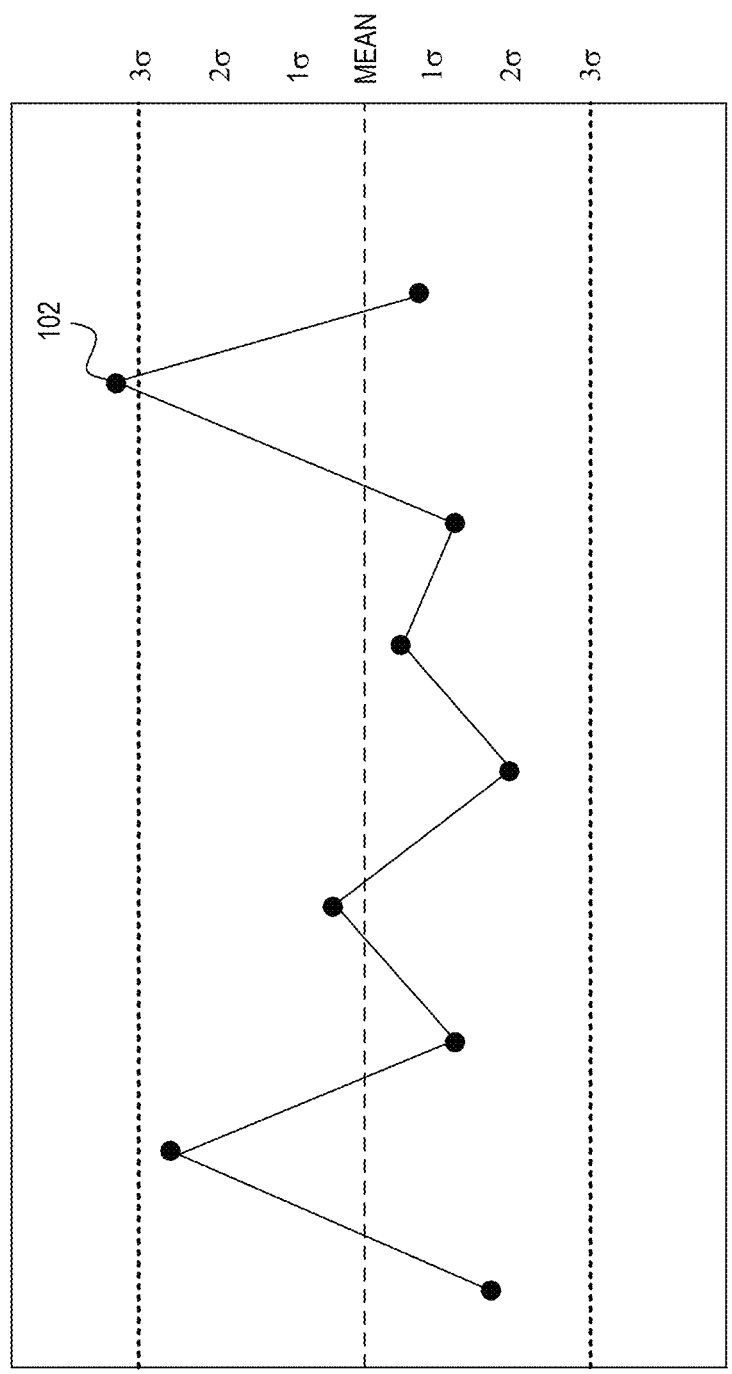
FIG. 1A illustrates the 3-sigma rule for data anomaly detection.

Example implementations address the technical problem of efficiently and accurately detecting anomalies in data generated on a data platform. A sigma statistics rule (also referred to as a "sigma rule") is a common approach to detecting abnormal data. In particular, the 3-sigma rule can be used to detect data anomalies, whereby normal data is between $\mu-3\sigma$ and $\mu+3\sigma$ (e.g., a 3-sigma normal range) as shown in FIG. 1A. Here, u is a mean of the distribution and $\sigma$ is its standard deviation. These two parameters can be obtained based on statistics and used to identify any outliers (e.g., data point 102) outside the 3-sigma normal range (shown with dotted lines). While example implementations will be discussed herein with reference to the 3-sigma rule, other sigma rules can also be used. For example, a 2-sigma rule, a 4-sigma rule, a 5-sigma rule, and so forth can be used instead of the 3-sigma rule.

Figure 1B:
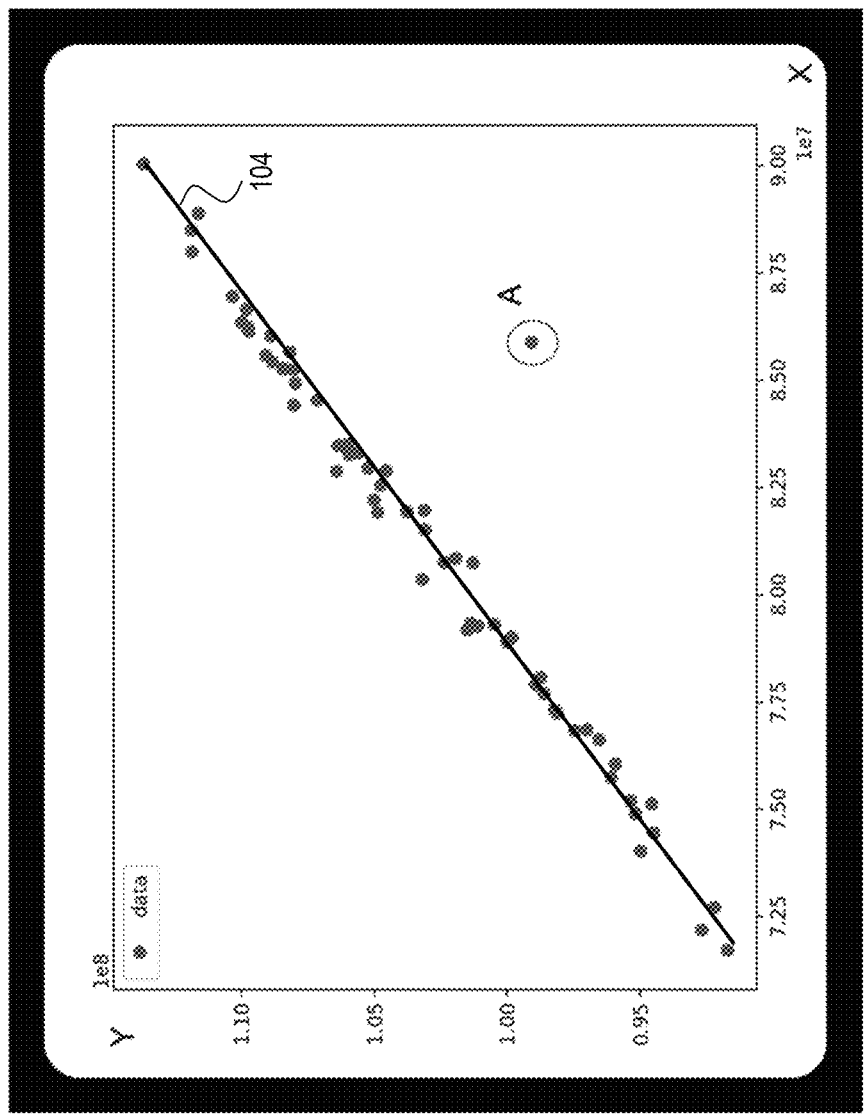
FIG. 1B is an example plot showing a data anomaly that is not detectable using a sigma rule.

However, there are situations where the sigma rule cannot accurately detect a data anomaly. In statistics, correlation is any statistical relationship between two random variables and usually refers to a degree to which a pair of variables are linearly related. Referring to FIG. 1B, an example plot indicating a data anomaly that is not detectable using a sigma rule is shown. While it is obvious to a human while observing FIG. 1B that data point A is an outlier, a computer cannot detect it using the known sigma rule. The plot shows a relationship between a variable X and a variable Y. If, for example, the 3-sigma rule is used to detect X, a normal range is between 7 and 9. For Y, a normal range is between 0.9 and 1.15. Accordingly, the data point A would not be considered an outlier since it's X value and Y value are between the respective normal ranges. However, a "real" normal range is along a solid line 104.

Figure 2:
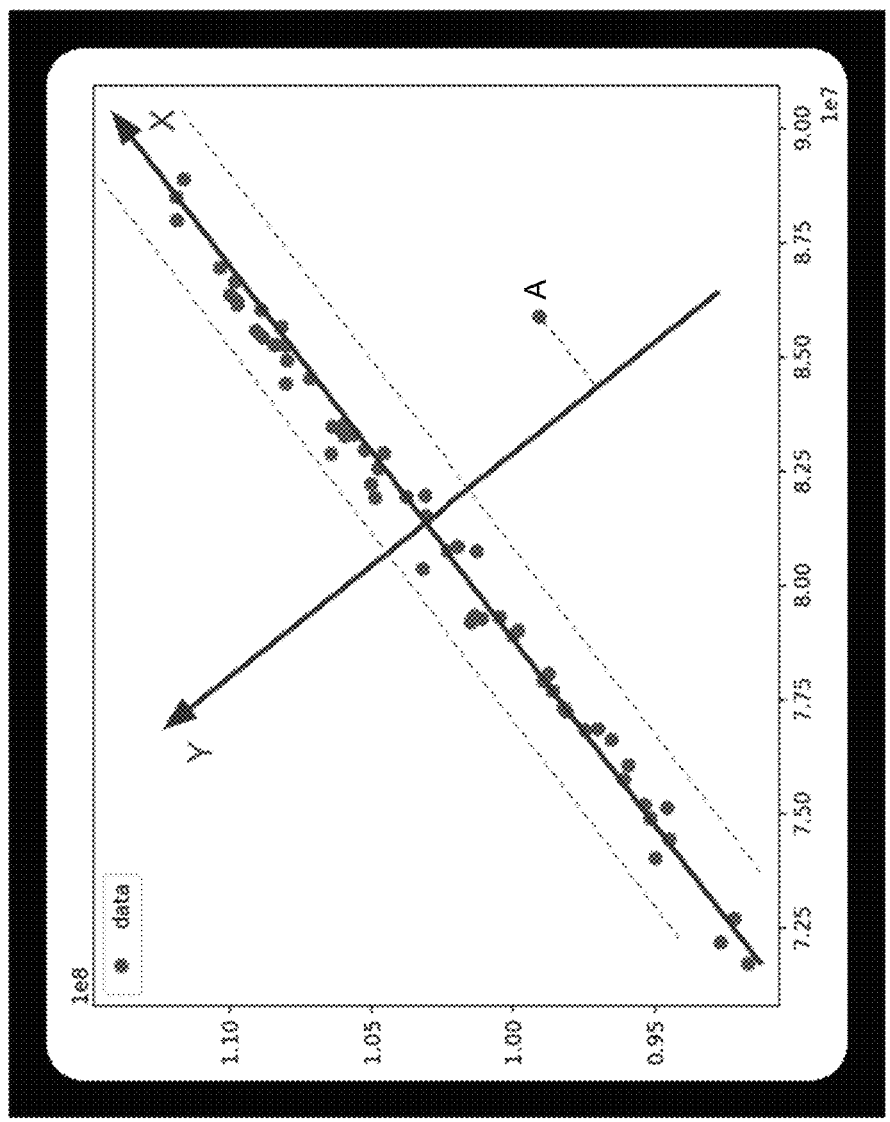
FIG. 2 is an example plot on an optimal coordinate system generated using principal component analysis.

To address the shortcomings of the 3-sigma rule or sigma rules in general, example implementations generate a new and optimal coordinate system using principal component analysis (PCA). In one example implementation, the optimal coordinate system is generated based on maximizing variance for two or more-dimensional data. In an alternative implementation, the optimal coordinate system is generated based on linear regression for two-dimensional data. Referring now to FIG. 2, an example plot on an optimal coordinate system generated using principal component analysis is shown. With the new X and Y axes and based on the sigma rule (e.g., illustrated as the dashed lines), point A is clearly not within the range of the sigma rule and is an outlier. While the examples of FIG. 1A, FIG. 1B, and FIG. 2 illustrate two-dimensional data points, example implementations also apply to any multi-dimensional data points (e.g., three-dimensional data points). The process for generating the optimal coordinate system will be discussed in more detail below.

Thus, example implementations address the technical problem of efficiently and accurately detecting data anomalies for large sets of data generated on a data platform. A new coordinate system is first built using PCA without reducing a number of dimensions, contrary to the general PCA technique. The data to be analyzed is then transformed into the new coordinate system. Once transformed, the sigma rule is applied, and data anomalies are detected and outputted. In some implementations, the data anomalies can be removed before sending the revised data to downstream systems for further operations. Thus, example implementations provide a technical solution that improves computer functions and operations by accurately detecting data anomalies and correcting these anomalies so as to not adversely affect downstream components, operations, and results.

Figure 3:
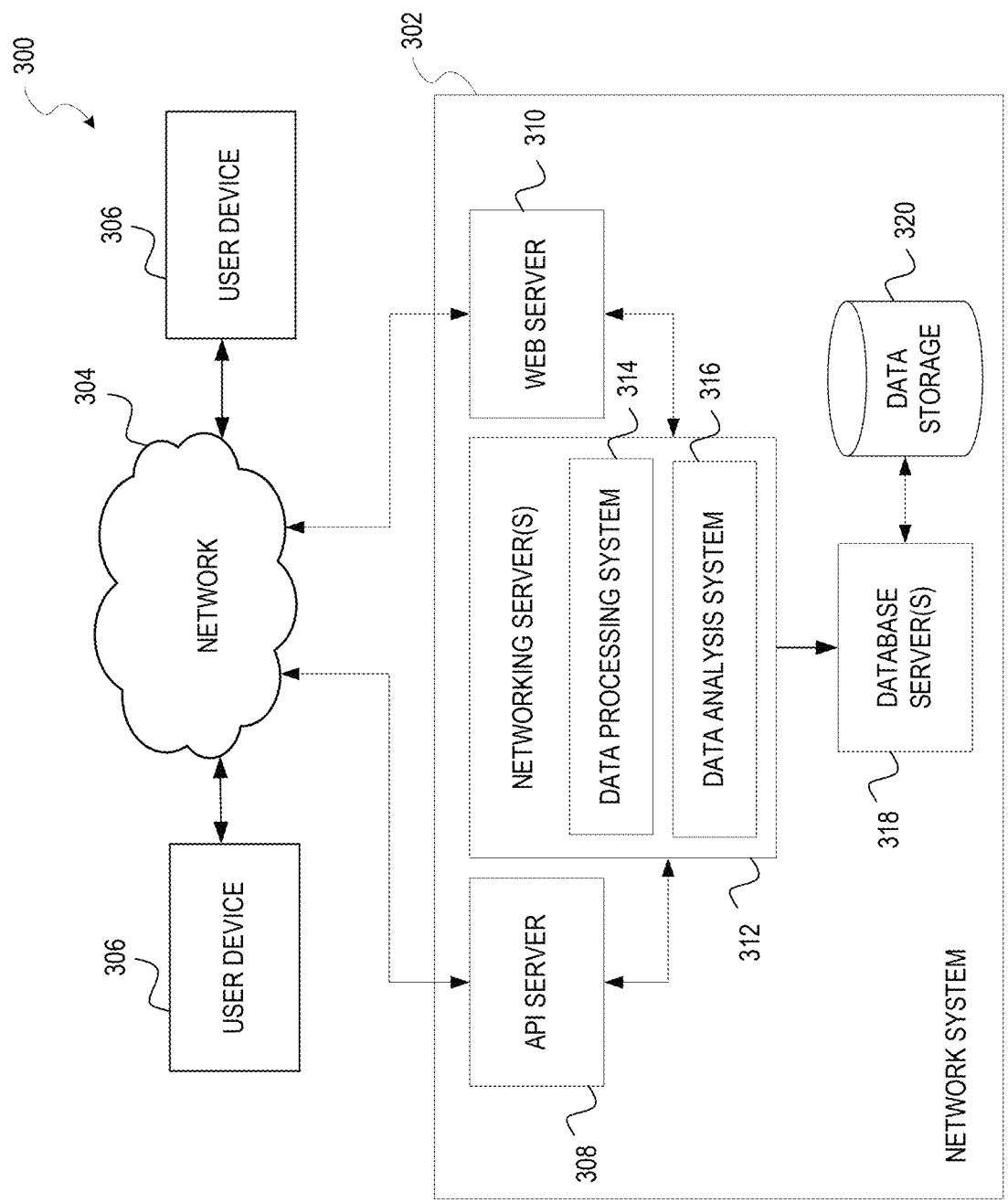
FIG. 3 is a diagram illustrating an example network environment suitable for detecting data anomalies using a sigma rule, according to example implementations.

FIG. 3 is a diagram illustrating an example network environment 300 suitable for detecting data anomalies using a sigma (statistics) rule, according to example implementations. A network system 302 provides server-side functionality via a communication network 304 (e.g., the Internet, wireless network, cellular network, or a Wide Area Network (WAN)) to a plurality of user devices 306. The network system 302 can comprise any entity having a data platform that generates large amounts of data. For example, the network system 302 can be associated with a banking site, an e-commerce site, a travel-related site, a social networking site, and so on.

In various cases, the user devices 306 are devices associated with user accounts of user of the network system 302. In some cases, the user devices 306 are devices of individuals using the network system 302 to perform searches, transactions, or other processes and thus, are triggering the generation of the data at the network system 302. In other cases, the user devices 306 are devices associated with an individual that is an operator or administrator of the network system 302 that uses their user device 306 to monitor and analyze the data and/or fix (e.g., remove) the data anomaly.

The user device 306 interfaces with the network system 302 via a connection with the network 304. Depending on the form of the user device 306, any of a variety of types of connections and networks 304 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 304 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 304 is a Wireless Fidelity (Wi-Fi, IEEE 802.11x type) connection, a Worldwide Interoperability for Microwave Access (WiMAX) connection, or another type of wireless data connection. In such an example, the network 304 includes one or more wireless access points coupled to a local area network (LAN), a wide area network (WAN), the Internet, or another packet-switched data network. In yet another example, the connection to the network 304 is a wired connection (e.g., an Ethernet link) and the network 304 is a LAN, a WAN, the Internet, or another packet-switched data network. Accordingly, a variety of different configurations are expressly contemplated.

The user device 306 may comprise, but is not limited to, a smartphone, tablet, laptop, multi-processor systems, microprocessor-based or programmable consumer electronics, game consoles, set-top boxes, a server, or any other communication device that can access the network system 302. The user device 306 may comprise a display component (not shown) to display information (e.g., in the form of user interfaces). The user device 306 can be operated by a human user and/or a machine user.

Turning specifically to the network system 302, an application programing interface (API) server 308 and a web server 310 are coupled to, and provide programmatic and web interfaces respectively to, one or more networking servers 312. The networking server(s) 312 host various systems including a data processing system 314 and a data analysis system 316, each of which can comprise a plurality of components and be embodied as hardware, software, firmware, or any combination thereof.

In particular, the data processing system 314 comprises components that generate data at the network system 302. The data can comprise logistical data, financial data, social networking data, transactional data, or any other type of data and can be structured or unstructured. For example, if the network system 302 is associated with a banking site, then the data processing system 314 can generate data related to banking transactions, account lookup operations, loan applications, and so forth. In another example, if the network system 302 is associate with a commerce site, then the data processing system 314 can generate data related to sales transactions, revenue information, number of users performing different operations (e.g., searching, adding to wishlist, purchasing, returning), and so on. The data can be generated by different components or sources.

The data analysis system 316 analyzes the data generated by the data processing system 314. Specifically, the data analysis system 316 aggregates and monitors the data generated by the data processing system 314 and detects any data anomalies. While the data analysis system 316 is shown within the network system 302, in alternative implementations, the data analysis system 316 can be located outside of the network system 302 but communicatively coupled via the network 304. The data analysis system 316 will be discussed in more detail in connection with FIG. 4 below.

The networking server(s) 312 are, in turn, coupled to one or more database servers 318 that facilitate access to one or more storage repositories or data storage 320. The data storage 320 is a storage device storing, for example, user accounts including user profiles and data generated by the data processing system 314.

Any of the systems, servers, data storage, or devices (collectively referred to as "components") shown in, or associated with, FIG. 3 may be, include, or otherwise be implemented in a special-purpose (e.g., specialized or otherwise non-generic) computer that can be modified (e.g., configured or programmed by software, such as one or more software components of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 3 may be combined, and the functions described herein for any single component may be subdivided among multiple components. Functionalities of one system may, in alternative examples, be embodied in a different system. For example, any number of user devices 306 or data storage 320 may be embodied within the network environment 300. While only a single network system 302 is shown, alternatively, more than one network system 302 can be included (e.g., localized to a particular region).

Figure 4:
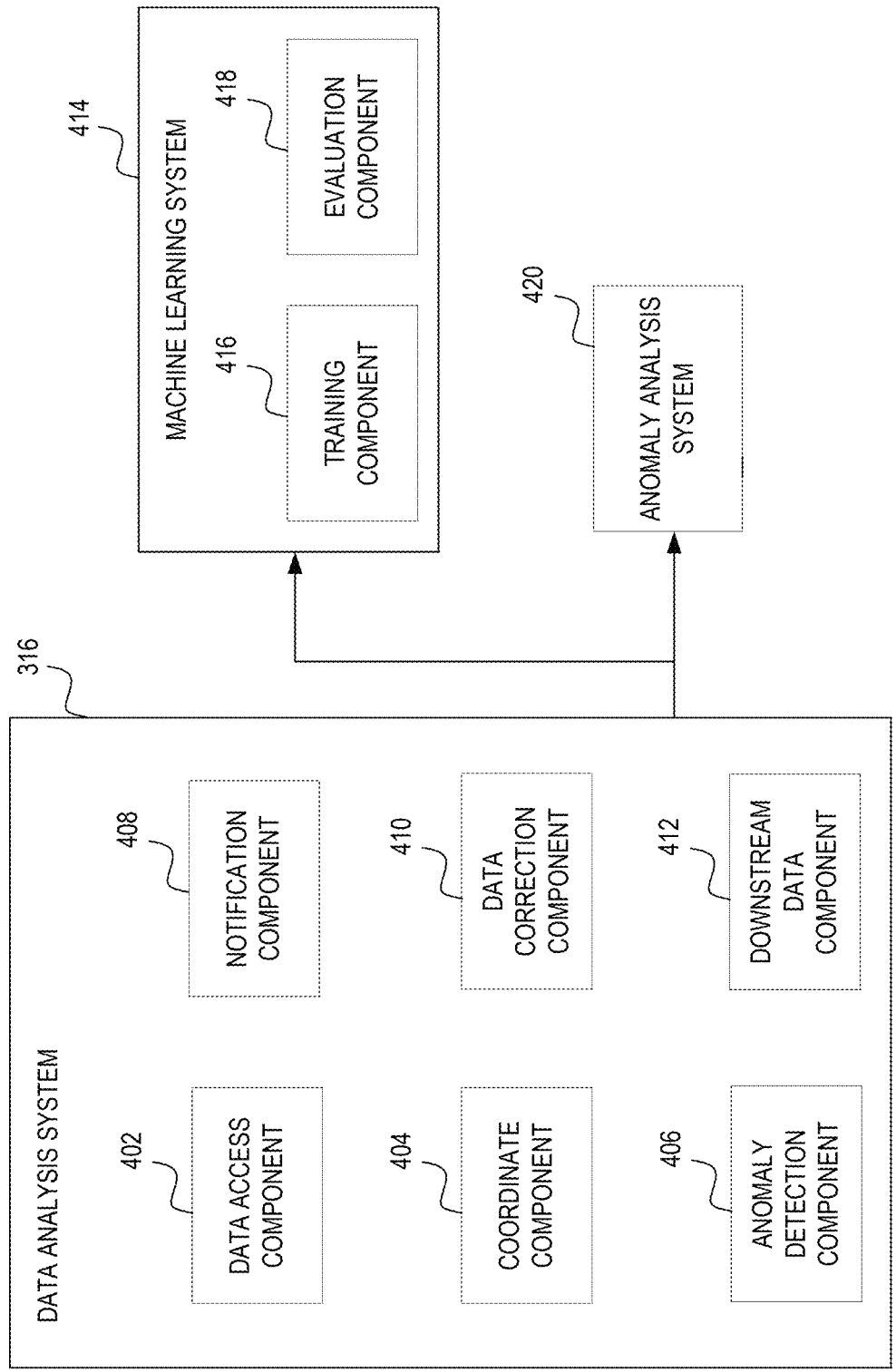
FIG. 4 is a diagram illustrating components of a data analysis system and example downstream systems, according to example implementations.

FIG. 4 is a diagram illustrating components of the data analysis system 316 in communication with downstream systems, according to example implementations. The data analysis system 316 accesses data generated by the data processing system 314 and analyzes the data to detect one or more data anomalies. To enable these operations, the data analysis system 316 comprises a data access component 402, a coordinate component 404, an anomaly detection component 406, a notification component 408, a data correction component 410, and a downstream data component 412 all configured in communication with one another (e.g., via a bus, shared memory, or a switch). The data analysis system 316 may comprise other components that are not necessary for operations of examiner implementations.

The data access component 402 is configured to access the data generated by the data processing system 314. The data may be accessed periodically (e.g., every evening, once a week), when a certain amount of data has been generated, and/or when triggered (e.g., by an administrator via the user device 306). The data access component 402 may obtain the data from the data processing system 314 directly, from the data storage 320, or a combination of both. The data that is accessed (e.g., aggregated) can be from different sources or components of the data processing system 314.

The coordinate component 404 is configured to generate a new and optimal coordinate system and transform the data into the new coordinate system. Example implementations generate the new coordinate system without reducing a number of dimensions using principal component analysis (PCA). PCA is traditionally used to reduce a number of dimensions of the data. However, the coordinate component 404 sets a strict condition that PCA is used to build the new coordinate system and not reduce the number of dimensions of the data. Assume that the data has m rows, each row of data has n features. The input data is a matrix, whereby m is a number of observations and n is a number of dimensions per observation. Thus, if the number of features of input data is n, the output of PCA is also n. Referring back to FIG. 2, if PCA is used to reduce the number of dimensions of data, it will pick up the values of the X axis and ignore the values of the Y axis. However, the outlier (data point A) is on the Y axis. Therefore, using PCA, the coordinate component 404 ensures that the number of dimensions of the input and the number of dimensions of the output remain the same.

In one implementation, the generation of the new optimal coordinate system is based on maximizing variance. To find a new X axis, the coordinate component 404 assumes that X is a vector with three unknown variables (u, v, w). The coordinate component 404 then maps all data points on X. The values on X and variance on X are identified. The variance is an expression that has an unknown variable X. For example, if the expression is $-3X^2+4X-5$, then X is max $(-3X^2+4X-5)$. This results in a line which has a maximum variance which results in the X axis.

A similar approach can be used to determine the Y and Z axes. For instance, once the X axis is determined, then the coordinate component 404 can identify a plane which is perpendicular to the X axis. The coordinate component 404 can map data points to this plane and maximize the variance to construct the Y axis. Once the Y axis is determined, then the Z axis can be similarly determined.

While example implementations have been discussed above based on maximizing variance, alternative implementation can use linear regression for two-dimensional data. Linear Regression attempts to obtain a linear function such as y=ax+b by determining values for parameters a and b. The values of a and b are determined by minimizing loss. For example, loss for a specific observation or point is a distance along a Y-axis. The smaller the loss, the better the function. Linear regression obtains a sum of the loss of all observations. Therefore, the value of a and b is obtained by minimizing the sum of the loss for all data points of the data. By determining the linear function, a new X-axis is determined. Then, a new Y-axis is identified perpendicular to the new X-axis.

Once the new coordinate system is generated by the coordinate component 404, the coordinate component transforms the data into the new coordinate system. This is done without reducing the number of dimensions.

The anomaly detection component 406 detects any data anomalies in the transformed data on the new coordinate system. In example implementations, the anomaly detection component 406 applies a sigma rule to the transformed data on the new coordinate system. In one implementation, the sigma rule is the 3-sigma rule. Any data points that are outside the range of the sigma rule is considered a data anomaly.

The notification component 408 is configured to provide a notification or alert regarding the detected data anomalies. In example implementations, the notification component 408 generates a report or other type of alert that indicates the data anomalies. The notification component 408 then transmits the report or alert to an appropriate system or individual. For example, the notification component 408 can transmit an email to the user device 306 of an administrator or trigger an alert to be displayed on a monitoring user interface of a device associated with the administrator.

The data correction component 410 is configured to remove or fix any data anomalies detected by the anomaly detection component 406. In one implementation, the data correction component 410 automatically removes the data anomaly to generate revised data. The automatic removal may be based on a set of rules that indicate situations when the data can be automatically removed and when the data needs to be reviewed before removal. In other implementations, the data correction component 410 flags the data anomalies and a human or machine user can review and trigger the removal of the flagged data anomalies.

Once the data anomalies are removed and the data revised, the downstream data component 412 can transmit the revised data to downstream components for further processing or operations. As an example, the downstream data component 412 can transmit the data to a machine learning system 414.

In implementations where the data correction component 410 flags data anomalies but does not correct them, the downstream data component 412 can transmit the uncorrected data with the data anomalies to a downstream component that can correct the uncorrected data (e.g., remove the data anomalies). For example, instead of or in addition to sending a notification generated by the notification component 408, the downstream data component 412 transmits the uncorrected data, which can be flagged by the data correction component 410, to a component outside of the data analysis system 316 (e.g., a component similar to the data correction component 410) for correction, or transmits the uncorrected data to a user (e.g., administrator), machine, or machine learning system for review prior to correction.

In implementations where the revised data is sent to the machine learning system 414, the machine learning system 414 is configured to train one or more machine learning (ML) models to determine probabilities for specific tasks. The machine learning system 414 also refines the ML models by retraining with further revised (training) data. The machine learning system 414 can then apply new data, which can be new revised data from data analysis system 316, to the trained ML model to obtain a result. As such, the machine learning system 414 includes a training component 416 and an evaluation component 418.

In some implementations, the training component 416 trains one or more ML models using the revised data. Because the revised data has the data anomalies removed, the training will result in a more accurate ML model. The machine learning can occur using an artificial intelligence such as a neural network and the training of the ML model(s) can include training for probabilities.

During runtime or inference time, the evaluation component 418 of the machine learning system 414 can be configured to determine a probability or other result using the trained ML model. In some cases, the revised data is data that is to be evaluated by the evaluation component 418. Similar with the training, the removal of the data anomalies before evaluation by the evaluation component 418 will provide more accurate results.

In a recommendation implementation, the trained ML model from the machine learning system 414 is a recommendation model. In these cases, the evaluation component 418 uses the recommendation model to generate recommendations.

In some implementation the notification generated by the notification component 408, the uncorrected data, and/or the revised data are transmitted (e.g., by the downstream data component 412) to an anomaly analysis system 420. The anomaly analysis system 420 performs an analysis of the data anomalies. For example, the anomaly analysis system 420 may try to determine what was the cause of each data anomaly. For example, the anomaly analysis system 420 can attempt to identify a component or system that may have caused an anomaly. In other cases, the anomaly analysis system 420 can attempt to correlate an anomaly with trends, current events, or other data to identify a cause of the anomaly or a connection between the trends, current events, and other data and the anomaly.

Figure 5:
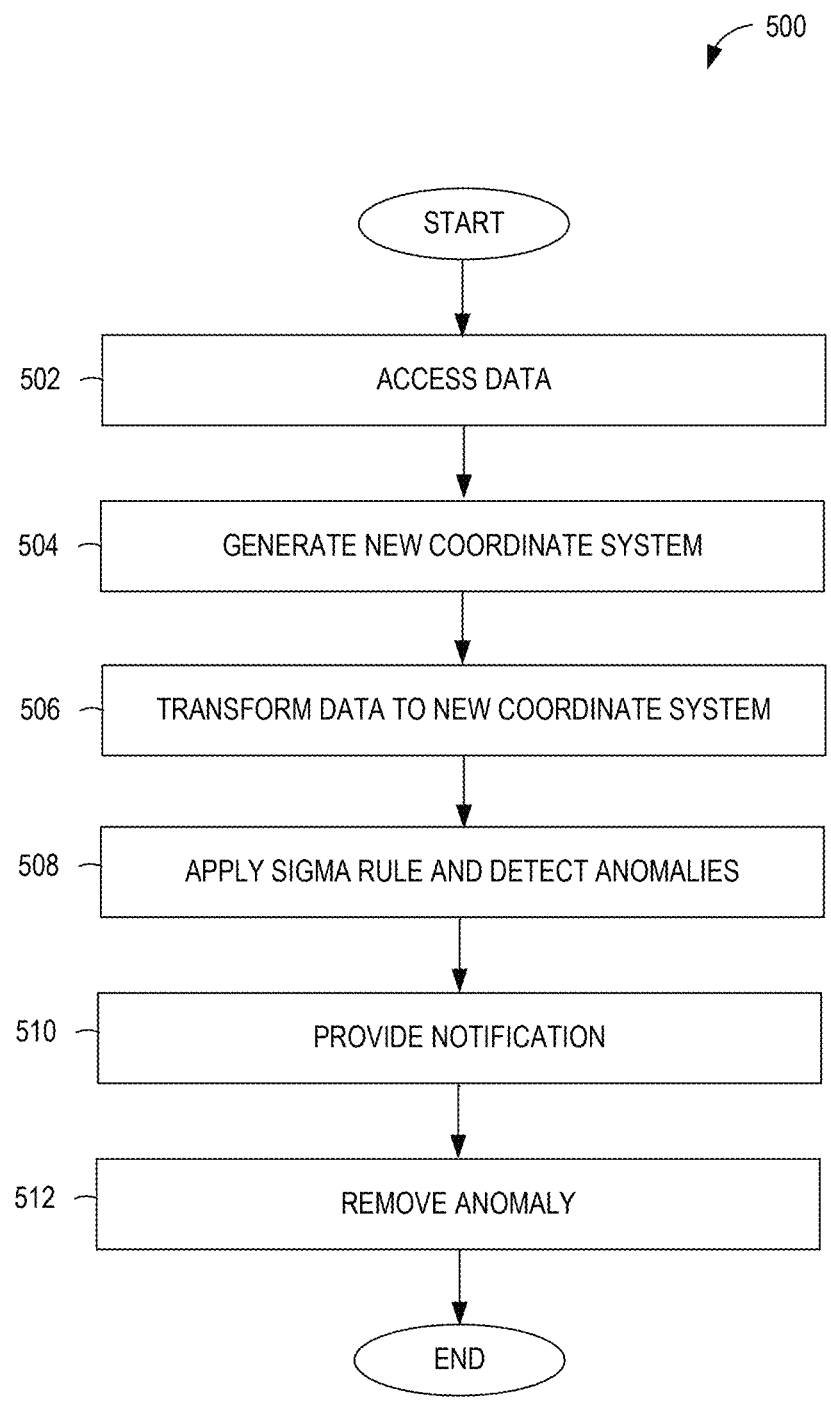
FIG. 5 is a flowchart illustrating operations of a method for detecting data anomalies using a sigma rule, according to example implementations.

FIG. 5 is a flowchart illustrating operations of a method 500 for detecting data anomalies using a sigma rule, according to example implementations. Operations in the method 500 may be performed by the data analysis system 316, using components described above with respect to FIG. 4. Accordingly, the method 500 is described by way of example with reference to the data analysis system 316. However, it shall be appreciated that at least some of the operations of the method 500 may be deployed on various other hardware configurations or be performed by similar components residing elsewhere in the network environment 300. Therefore, the method 500 is not intended to be limited to the data analysis system 316.

In operation 502, data generated by the data platform (e.g., the data processing system 314) is accessed by the data access component 402. The data may be accessed periodically, when a certain amount of data has been generated, or when triggered by a user. The data access component 402 may aggregate/collect the data directly from the data processing system 314, from the data storage 320, or a combination of both. In example implementations, the data access component 402 may be configured or instructed to access, for example, a certain type of data, a certain date range of data, and/or data generated by particular component(s) for analysis. The data can be from any source associated with the data processing system 314.

In operation 504, the coordinate component 404 generates a new and optimal coordinate system. In example implementations, the coordinate component 404 generates the optimal coordinate system using PCA without reducing a number of dimensions of the data. In one implementation, the generation of the optimal coordinate system is based on maximizing variance. To find a new X axis, the coordinate component 404 maps all data points on X. The values on X and variance on X are identified. The variance is then maximized. Once the X axis is determined, then the coordinate component 404 identifies a plane which is perpendicular to the X axis. The coordinate component 404 then maps data points to this plane and maximizes the variance to construct the Y axis. A similar process can be used to find the Z axis, if needed.

In operation 506, the coordinate component 604 transforms the data into the optimal coordinate system. This is done without reducing the number of dimensions of the data.

In operation 508, the anomaly detection component 406 applies a sigma rule to the transformed data on the optimal coordinate system to detect anomalies. The sigma rule provides a normal range for the data. Any data points outside of the normal range is considered a data anomaly. In one implementation, the sigma rule applied to the transformed data is the 3-sigma rule.

In operation 510, notification component 408 provides a notification or alert regarding the detected data anomalies. In example implementations, the notification component 408 generates a report or other type of notification or alert that indicates the data anomalies. The notification component 408 then transmits the notification to, or causes the notification to be displayed on, an appropriate system. In some cases, the notification can be transmitted along with corresponding data or revised data to the anomaly analysis system 420. The anomaly analysis system 420 can then attempt to determine what was the cause of each data anomaly or attempt to correlate an anomaly with trends, current events, or other data to identify a cause or connection.

In operation 512, the data correction component 410 removes any data anomalies detected by the anomaly detection component 406. In one implementation, the data correction component 410 automatically removes the data anomaly to generate updated data. The automatic removal may be based on a set of rules that indicate situations when the data can be automatically removed and when the data needs to be reviewed before removal. In some cases, the data correction component 410 flags the data anomaly and a human or machine user triggers the removal of the flagged data after review.

It is noted that operations 510 and 512 can be optional. Additionally, operation 512 can be performed before operation 510.

Figure 6:
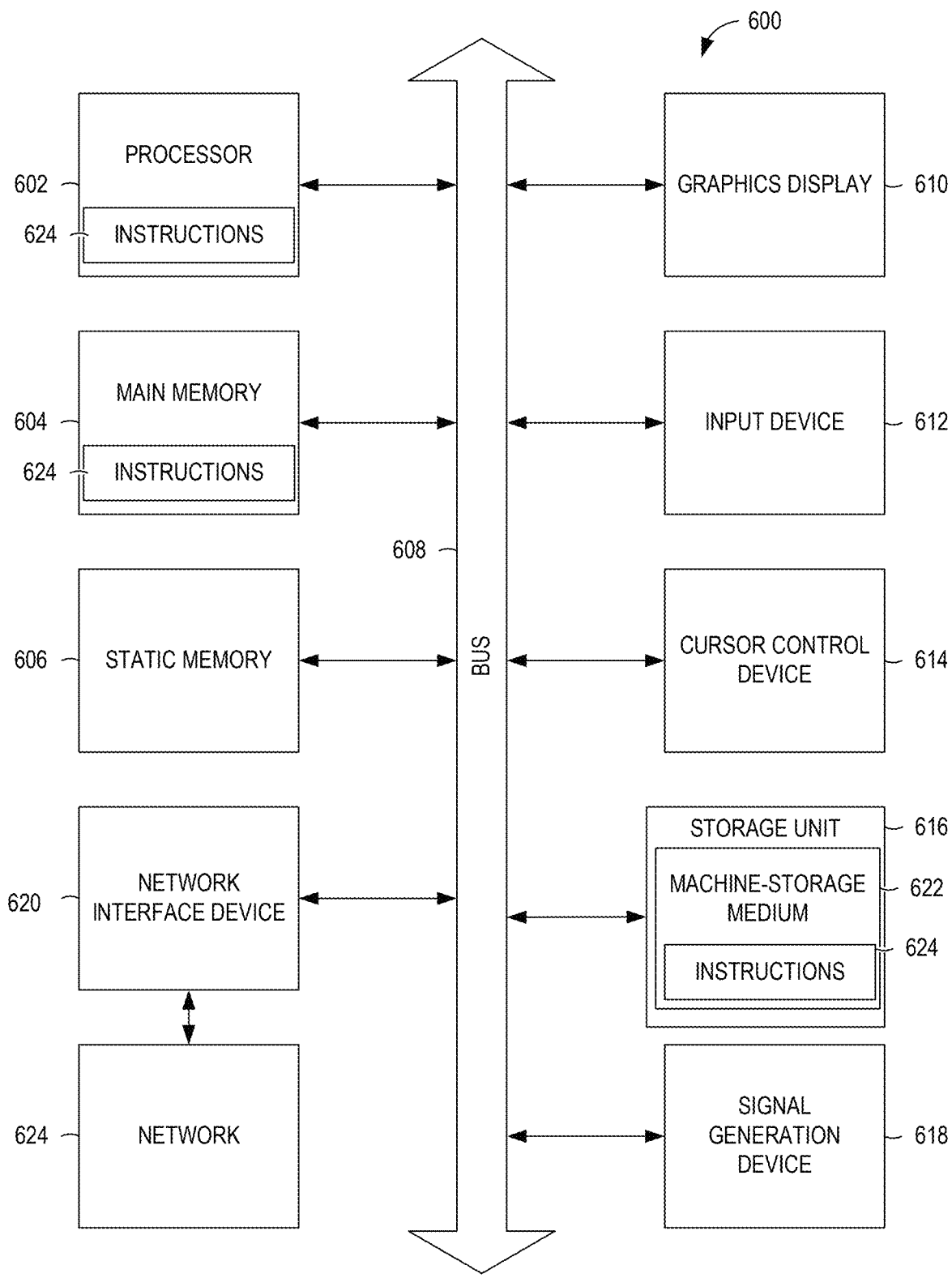
FIG. 6 is a block diagram illustrating components of a machine, according to some examples, able to read instructions from a machine-storage medium and perform any one or more of the methodologies discussed herein.

FIG. 6 illustrates components of a machine 600, according to some example implementations, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagram of FIG. 5. In one implementation, the instructions 624 can transform the machine 600 into a particular machine (e.g., specially configured machine) programmed to carry out the described and illustrated functions in the manner described.

In alternative implementations, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, a compute beacon, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes one or more of a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

In some implementations, the machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-storage media (e.g., tangible and non-transitory machine-storage media). The instructions 624 may be transmitted or received over a network 626 via the network interface device 620.

In some example implementations, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the components described herein.

Executable Instructions and Machine-Storage Medium

The various memories (e.g., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed implementations.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium," and "device-readable medium" mean the same thing and may be used interchangeably in this disclosure. The terms are defined to include both machine-storage medium/media and signal medium/media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some implementations, a hardware component may be implemented mechanically, electronically, or any suitable combination thereof. For example, a hardware component may include dedicated circuitry or logic that is permanently configured to perform certain operations. For example, a hardware component may be a special-purpose processor, such as a field programmable gate array (FPGA) or an ASIC. A hardware component may also include programmable logic or circuitry that is temporarily configured by software to perform certain operations. For example, a hardware component may include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor may be configured as respectively different special-purpose processors (e.g., comprising different hardware components) at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, a processor being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example implementations, the one or more processors or processor-implemented components may be located in a single geographic location (e.g., within a home environment, an office environment, or a server farm). In other example implementations, the one or more processors or processor-implemented components may be distributed across a number of geographic locations.

EXAMPLES

Example 1 is a method for detecting data anomalies. The method comprises accessing, by a server, data generated on a data platform; detecting, by the server, one or more data anomalies in the accessed data, the detecting comprising generating an optimal coordinate system without reducing a number of dimensions using principal component analysis (PCA), transforming the data into the optimal coordinate system without reducing the number of dimensions, and applying a sigma rule to the transformed data on the optimal coordinate system; and generating and transmitting, by the server, a notification of the one or more data anomalies.

In example 2, the subject matter of example 1 can optionally include wherein the sigma rule comprises a 3-sigma rule.

In example 3, the subject matter of any of examples 1-2 can optionally include wherein the sigma rule comprises one of a 2-sigma rule, 4-sigma rule, or 5-sigma rule.

In example 4, the subject matter of any of examples 1-3 can optionally include wherein generating and transmitting the notification comprises providing an indication of the one or more data anomalies to an anomaly analysis system, the anomaly analysis system performing further analysis of the one or more data anomalies.

In example 5, the subject matter of any of examples 1-4 can optionally include automatically removing the one or more data anomalies to generate revised data.

In example 6, the subject matter of any of examples 1-5 can optionally include training a machine learning model using the revised data with the one or more data anomalies automatically removed.

In example 7, the subject matter of any of examples 1-6 can optionally include wherein training the machine learning model comprises training a recommendation model to provide recommendations.

In example 8, the subject matter of any of examples 1-7 can optionally include wherein generating the optimal coordinate system is based on maximizing variance.

In example 9, the subject matter of any of examples 1-8 can optionally include wherein generating the optimal coordinate system is based on linear regression.

Example 10 is a system for detecting data anomalies. The system comprises one or more processors and a memory storing instructions that, when executed by the one or more processors, cause the one or more processors to perform operations comprising accessing data generated on a data platform; detecting one or more data anomalies in the accessed data, the detecting comprising generating an optimal coordinate system without reducing a number of dimensions using principal component analysis (PCA), transforming the data into the optimal coordinate system without reducing the number of dimensions, and applying a sigma rule to the transformed data on the optimal coordinate system; and generating and transmitting a notification of the one or more data anomalies.

In example 11, the subject matter of example 10 can optionally include wherein the sigma rule comprises a 3-sigma rule.

In example 12, the subject matter of any of examples 10-11 can optionally include wherein the sigma rule comprises one of a 2-sigma rule, 4-sigma rule, or 5-sigma rule.

In example 13, the subject matter of any of examples 10-12 can optionally include wherein generating and transmitting the notification comprises providing an indication of the one or more data anomalies to an anomaly analysis system, the anomaly analysis system performing further analysis of the one or more data anomalies.

In example 14, the subject matter of any of examples 10-13 can optionally include wherein the operations further comprise automatically removing the one or more data anomalies to generate revised data.

In example 15, the subject matter of any of examples 10-14 can optionally include wherein the operations further comprise training a machine learning model using the revised data with the one or more data anomalies automatically removed.

In example 16, the subject matter of any of examples 10-15 can optionally include wherein training the machine learning model comprises training a recommendation model to provide recommendations.

In example 17, the subject matter of any of examples 10-16 can optionally include wherein generating the optimal coordinate system is based on maximizing variance.

In example 18, the subject matter of any of examples 10-17 can optionally include wherein generating the optimal coordinate system is based on linear regression.

Example 19 is a computer-storage medium comprising instructions which, when executed by one or more processors of a machine, cause the machine to perform operations for detecting data anomalies. The operations comprise accessing data generated on a data platform; detecting one or more data anomalies in the accessed data, the detecting comprising generating an optimal coordinate system without reducing a number of dimensions using principal component analysis (PCA), transforming the data into the optimal coordinate system without reducing the number of dimensions, and applying a sigma rule to the transformed data on the optimal coordinate system; and generating and transmitting a notification of the one or more data anomalies.

In example 20, the subject matter of example 19 can optionally include wherein the sigma rule comprises a 3-sigma rule.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes may be made to these examples without departing from the broader scope of examples of the present invention. For instance, various examples or features thereof may be mixed and matched or made optional by a person of ordinary skill in the art. Such examples of the present subject matter may be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present invention as represented by the appended claims. The specification and drawings are, accordingly, to be regarded in an illustrative rather than a restrictive sense.

What is claimed is:

1. A method for improving computer detection of data anomalies that are not detectable using a sigma rule applied to untransformed data, the method comprising:
    accessing, by a data analysis system of a server, data generated on a data platform, the data comprising the untransformed data;
    based on the accessed data, generating, by a coordinate component of the data analysis system, an optimal coordinate system without reducing a number of dimensions of the accessed data using principal component analysis (PCA);
    transforming, by the coordinate component, the accessed data onto the optimal coordinate system without reducing the number of dimensions of the accessed data resulting in a new set of coordinates for the transformed data;
    applying the sigma rule to the transformed data on the optimal coordinate system to detect one or more data anomalies, and
    generating and transmitting, by the server, a notification of the one or more data anomalies.

2. The method of claim 1, wherein the sigma rule comprises a 3-sigma rule.

3. The method of claim 1, wherein the sigma rule comprises one of a 2-sigma rule, 4-sigma rule, or 5-sigma rule.

4. The method of claim 1, wherein generating and transmitting the notification comprises providing an indication of the one or more data anomalies to an anomaly analysis system, the anomaly analysis system performing further analysis on the one or more data anomalies.

5. The method of claim 1, further comprising:
    automatically removing the one or more data anomalies to generate revised data.

6. The method of claim 5, further comprising:
    training a machine learning model using the revised data with the one or more data anomalies automatically removed.

7. The method of claim 6, wherein training the machine learning model comprises training a recommendation model to provide recommendations.

8. The method of claim 1, wherein generating the optimal coordinate system is based on maximizing variance, the generating the optimal coordinate system comprising:
    assuming X is a vector, mapping all data points on X;
    identifying values on X and a variance on X; and
    maximizing the variance to derive a new X axis on the optimal coordinate system.

9. The method of claim 1, wherein generating the optimal coordinate system is based on linear regression.

10. A system for improving computer detection of data anomalies that are not detectable using a sigma rule applied to untransformed data, the system comprising:
    one or more processors; and
    a memory storing instructions that, when executed by the one or more processors, cause the one or more processors to perform operations comprising:
        accessing data generated on a data platform, the data comprising the untransformed data;
        based on the accessed data, generating an optimal coordinate system without reducing a number of dimensions of the accessed data using principal component analysis (PCA);
        transforming the accessed data onto the optimal coordinate system without reducing the number of dimensions of the accessed data resulting in a new set of coordinates for the transformed data;
        applying the sigma rule to the transformed data on the optimal coordinate system to detect one or more data anomalies; and
        generating and transmitting a notification of the one or more data anomalies.

11. The system of claim 10, wherein the sigma rule comprises a 3-sigma rule.

12. The system of claim 10, wherein the sigma rule comprises one of a 2-sigma rule, 4-sigma rule, or 5-sigma rule.

13. The system of claim 10, wherein generating and transmitting the notification comprises providing an indication of the one or more data anomalies to an anomaly analysis system, the anomaly analysis system performing further analysis of the one or more data anomalies.

14. The system of claim 10, wherein the operations further comprise:

automatically removing the one or more data anomalies to generate revised data.

15. The system of claim 14, wherein the operations further comprise:
training a machine learning model using the revised data with the one or more data anomalies automatically removed.

16. The system of claim 15, wherein training the machine learning model comprises training a recommendation model to provide recommendations.

17. The system of claim 10, wherein generating the optimal coordinate system is based on maximizing variance, the generating the optimal coordinate system comprising:
assuming X is a vector, mapping all data points on X;
identifying values on X and a variance on X; and
maximizing the variance to derive a new X axis on the optimal coordinate system.

18. The system of claim 10, wherein generating the optimal coordinate system is based on linear regression.

19. A machine-storage medium comprising instructions which, when executed by one or more processors of a machine, cause the machine to perform operations for improving computer detection of data anomalies that are not detectable using a sigma rule applied to untransformed data, the operations comprising:
accessing data generated on a data platform, the data comprising the untransformed data;
based on the accessed data, generating an optimal coordinate system without reducing a number of dimensions of the accessed data using principal component analysis (PCA);
transforming the data onto the optimal coordinate system without reducing the number of dimensions of the accessed data resulting in a new set of coordinates for the transformed data;
applying the sigma rule to the transformed data on the optimal coordinate system to detect one or more data anomalies; and
generating and transmitting a notification of the one or more data anomalies.

20. The machine-storage medium of claim 19, wherein the sigma rule comprises a 3-sigma rule.

* * * * *